United States Patent [19]

Örnberg

[11] Patent Number: 5,718,518
[45] Date of Patent: Feb. 17, 1998

[54] AXIS JOINT AND SLIDE BEARING WITH INTEGRAL SEAL

[75] Inventor: Rolf Örnberg, Kristineberg, Sweden

[73] Assignee: Hultdin System AB, Mala, Sweden

[21] Appl. No.: 817,708

[22] PCT Filed: Oct. 19, 1994

[86] PCT No.: PCT/SE94/00979

§ 371 Date: Apr. 10, 1997

§ 102(e) Date: Apr. 10, 1997

[87] PCT Pub. No.: WO96/12896

PCT Pub. Date: May 2, 1996

[51] Int. Cl.⁶ .............................. F16C 33/74; F16B 7/02
[52] U.S. Cl. ........................ 384/428; 384/138; 403/370
[58] Field of Search .................................. 384/295, 416, 384/428, 439, 130, 138; 403/370, 368, 367

[56] References Cited

U.S. PATENT DOCUMENTS 3,133,769  5/1964  Drake ........................ 384/145
3,432,214  3/1969  Cashman et al. ................ 384/292
5,209,594  5/1993  Svenson et al. ................. 403/11

FOREIGN PATENT DOCUMENTS 0241968  10/1987  European Pat. Off. .
1241143   7/1960  France .
 458154   3/1928  Germany .
3122830  12/1982  Germany .

*Primary Examiner*—Thomas R. Hannon
*Attorney, Agent, or Firm*—Nixon & Vanderhye P.C.

[57] ABSTRACT

First and second construction elements, such as claws of a timber grab, are mounted for relative rotational movement with respect to each other by an axis joint. The axis joint includes a bearing bushing an a bearing shaft. The bearing shaft has inner conical surfaces which cooperate with outer conical surfaces of conical washers which are held in place by a screw and nut. Under the influence of the screw and nut the components of the axis joint are held together so that there is a butt connection. The bearing bushing contains a slide bearing surface with internal resilient sealing lips, and annular openings are provided so that the sealing lips can expand freely upon insertion of the bearing shaft into the sleeve and resiliently abut the bearing shaft. When inoperative the sealing lips have an inner diameter less than the outer diameter of the bearing shaft by about 0.1–1.0 mm.

20 Claims, 3 Drawing Sheets

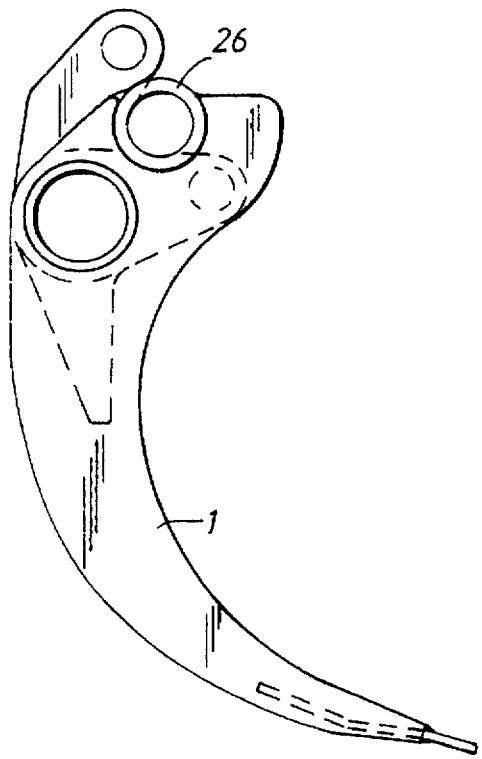
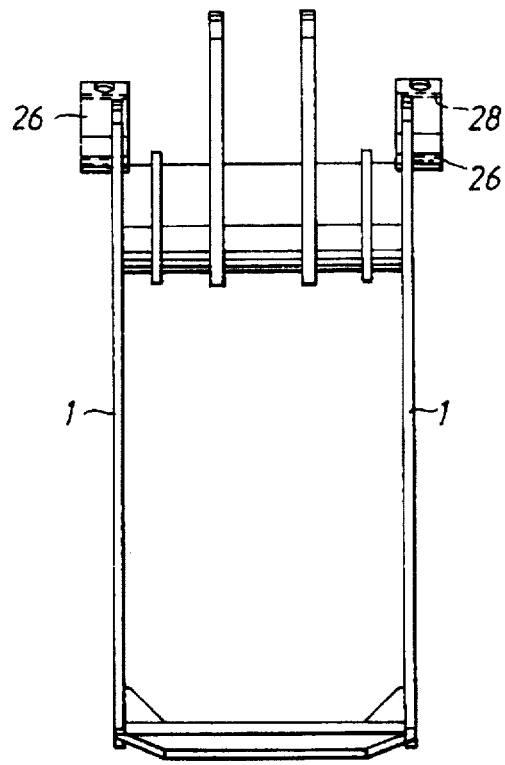
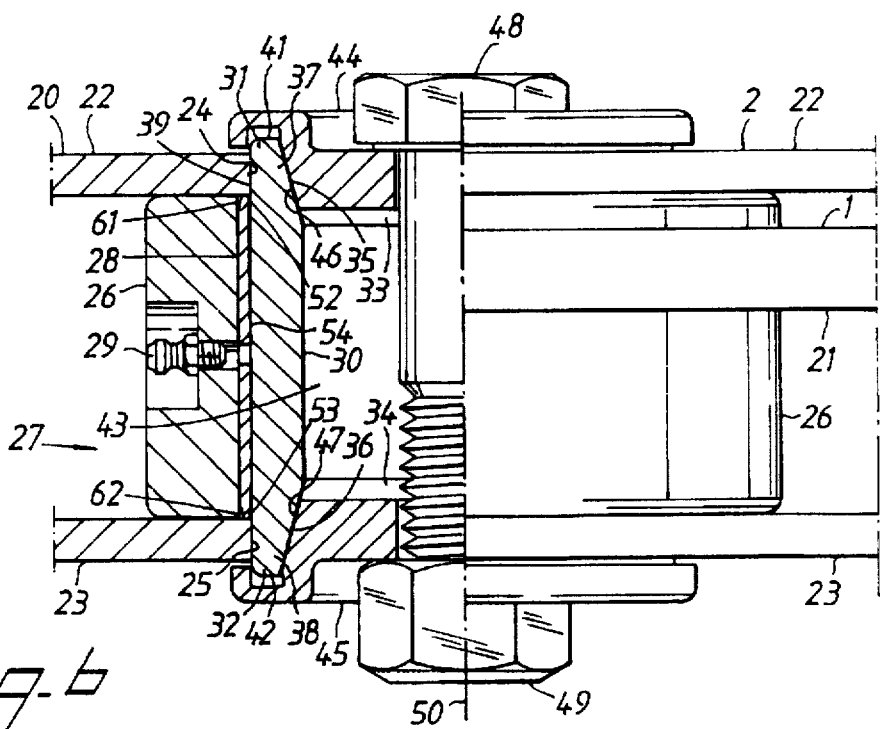

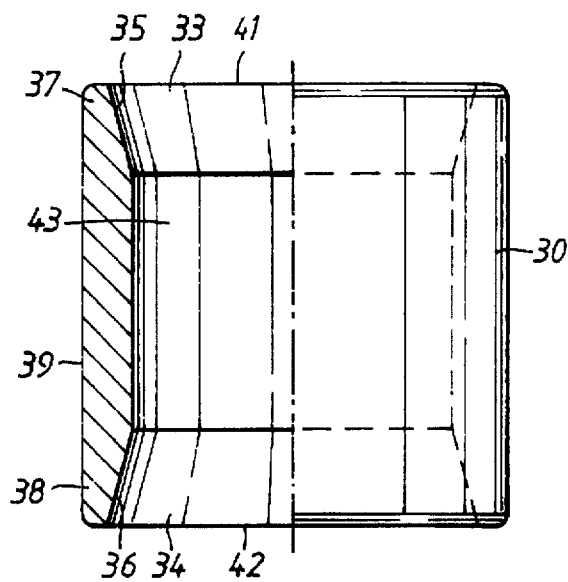
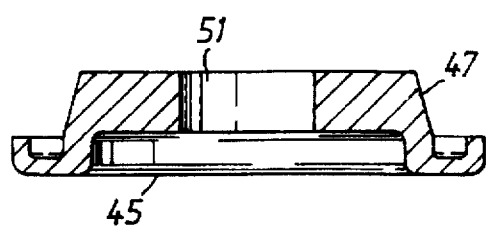
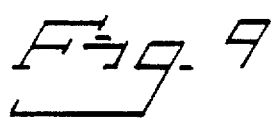
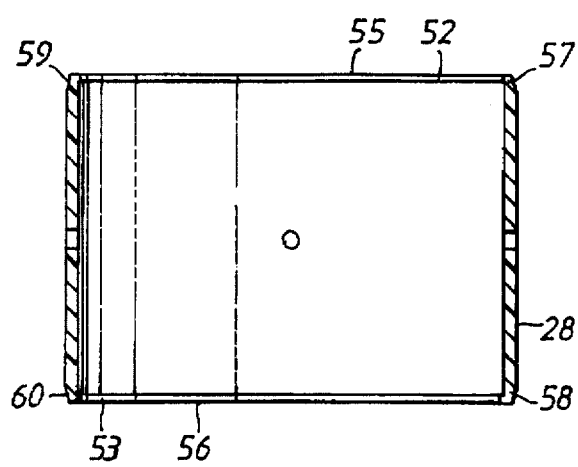
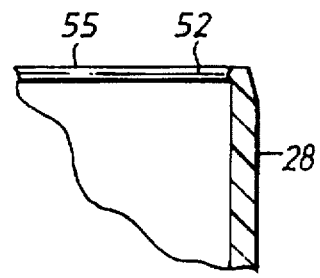

AXIS JOINT AND SLIDE BEARING WITH INTEGRAL SEAL

BACKGROUND AND SUMMARY OF THE INVENTION

The present invention relates to an axis joint for rotatable journalling of first and second construction elements in relation to each other, said first construction element comprising two parallel connecting pieces, spaced apart from each other and having circular openings located opposite each other, said axis joint comprising a bearing bushing rigidly connected to the second construction element and located between said connecting pieces concentrically with their openings, and a cylindrical bearing shaft extending concentrically through the bearing bushing and with its end portions through said openings, each end portion having an outwardly diverging recess to form an inner conical surface having predetermined conicity and a peripheral clamping portion defined by said conical surface, the cylindrical outer surface of the bearing shaft and end surface of the bearing shaft, the axis joint also comprising an engagement member in the form of a conical washer for each clamping portion and provided with a central opening, said washer having a conical outer surface for cooperation with the inner conical surface of the clamping portion and arranged to be received in the recess of the end portion, and a screw member which is passed through the central opening of the washers and an opening through the bearing shaft for axial displacement of the washers into said recesses. The invention also relates to a slide bearing means for axis joints for assembly between a bearing shaft and bearing bushing, comprising a cylindrical sleeve and sealing members to seal the cylindrical sliding surfaces of the sleeve and the bearing shaft.

Difficulties are encountered in the workshop industry in obtaining simple, reliable and play-free locking of axis joints in which the axis to be locked supports a machine part that is loaded with great pressure and simultaneously turned in relation to the axis. Another difficulty encountered with such axis joints is to protect the bearing surfaces from penetration of dirt, which causes abnormal wear of the bearing parts. Examples of such axis joints with locking and bearing problems are the journalling of the grab shanks in a timber grab, the journalling of the hydraulic cylinder against these grab shanks and the journalling of the parallel stays in both grab shanks. Conventional slide bearing arrangements have a sleeve and separate sealing rings received in special seats in the sleeve and the bushing in which the sleeve is mounted. As already mentioned, such arrangements do not provide sufficient sealing against dirt and lubricants. Wear may therefore occur on the sliding surfaces and lubrication must be performed at short intervals. They are also expensive to manufacture and time-consuming to assemble.

The object of the present invention is to provide an axis joint of such design as to ensure reliable, play-free locking and which has a slide bearing means that substantially reduces the above-mentioned problems associated with conventional slide bearing arrangements.

The axis joint according to the invention is characterized in that under influence of said screw members the clamping portions are arranged to abut directly against said connecting pieces so that a butt connection is obtained between the bearing shaft and the connecting pieces; that the bearing shaft is in the form of a sleeve with a cylindrical through-opening having a diameter equivalent to the smallest diameter of said recesses; that the bearing bushing contains a slide bearing consisting of a cylindrical sleeve provided at each end with internal, resilient, sealing lips in one piece with the sleeve; that an annular space is arranged radially outside each end portion to permit radial resilient expansion of the sealing lips upon insertion of the bearing shaft into the sleeve and resilient, sealing abutment against the bearing shaft during operation; and that in inoperative state the sealing lips have an inner diameter slightly less than the diameter of the bearing shaft so that said resilient expansion and sealing abutment is obtained.

The slide bearing means according to the invention is characterized in that the sealing member is formed by an internal sealing lip at each end portion of the sleeve immediately adjacent the end surfaces of the sleeve; that the sleeve and sealing lips are made in one piece from a resilient material; that an annular space is arranged radially outside each end portion to permit radial, resilient expansion of the sealing lip upon insertion of the bearing shaft into the sleeve and resilient, sealing abutment against the bearing shaft during operation; and that in inoperative state the sealing lips have an inner diameter slightly less than the diameter of the bearing shaft so that said resilient expansion and sealing abutment is obtained.

BRIEF DESCRIPTION OF THE DRAWINGS

FIGS. 4 and 5 are two different views of the inner gripping claw of the grab according to FIGS. 1–3.

FIG. 6 shows parts of a stand and the inner gripping claw of the grab according to FIGS. 1–3, rotatably joined by an axis joint according to the invention.

FIG. 7 is a view of the bearing shaft of the axis joint according to FIG. 6.

FIG. 8 is a cross-sectional view of a washer in the axis joint according to FIG. 6.

FIG. 9 is a view of the slide bearing sleeve in the bearing bushing of the axis joint according to FIG. 6.

FIG. 10 is a view of part of the slide bearing sleeve according to FIG. 9.

DETAILED DESCRIPTION OF THE DRAWINGS

Figure 1:
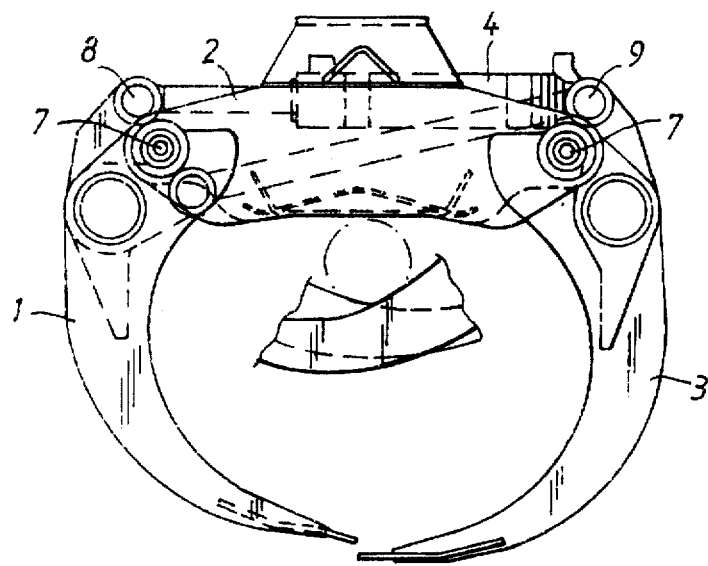
FIGS. 1, 2 and 3 are different views of a timber grab with axis joints according to the present invention.
Figure 2:
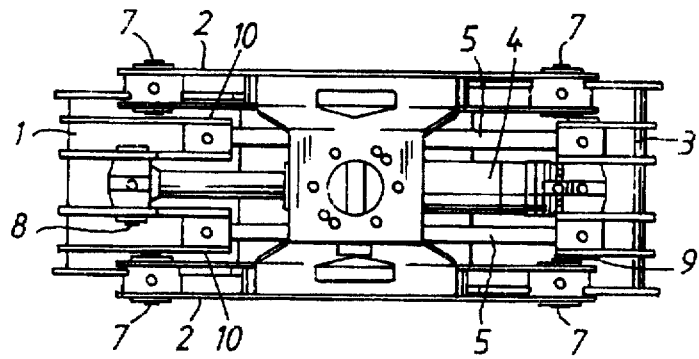
Figure 3:
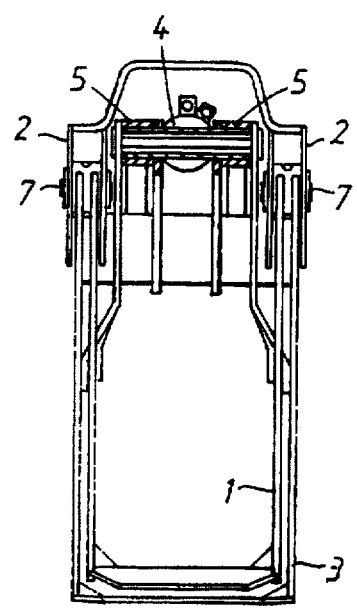

FIGS. 1–3 show one embodiment of a timber grab with an inner gripping claw 1 journalled at one end of a stand 2 in a bearing 7, and with an outer gripping claw 3 journalled at the other end of the stand 2 in a corresponding bearing 7. A hydraulic cylinder 4 is also journalled in the two gripping claws, with its piston rod end disposed in one gripping claw in a bearing 8, and with the cylinder end in the other gripping claw in a bearing 9. Two parallel stays 5 are also journalled between the two gripping claws 1, 3, on each side of the hydraulic cylinder 4, one of their ends being journalled in the same shaft as the cylinder end of the hydraulic cylinder in bearing 9, and the other end in separate bearings 10 on the gripping claws.

The function and problem areas of the grab in the bearings 7, 8, 9, 10 can be described as follows: When the hydraulic cylinder 4 is supplied with hydraulic oil, the gripping claws 1, 3, are opened or closed by being turned in the bearings 7 due to the influence of the hydraulic cylinder 4 and also the parallel stays 5. Since the hydraulic cylinder 4 operates with great hydraulic pressure, considerable forces are transmitted to the gripping claws 1, 3, whereupon said bearings are also loaded with high surface pressure. To enable long service life for the construction as a whole it is important that the shafts around which the movable elements shall turn can be locked in a butt state, and also that dirt is prevented from penetration to the slide bearing member pressed into the movable element, while at the same time lubricant can be efficiently supplied to the movable surface.

All the above mentioned bearings 7, 8, 9, 10 constitute axis joints that are designed in accordance with the present invention.

FIG. 6 shows a preferred embodiment of an axis joint that can be assembled on the grab described above. The axis joint connects a first construction element 20 and a second construction element 21 together. The first construction element 20 comprises two parallel, plate shaped connecting pieces 22, 23, spaced a predetermined distance from each other and having circular openings 24, 25 located opposite each other. In the application illustrated the first construction element 20 comprises the stand 2 of the grab and the second construction element 21 one of the gripping claws 1, an upper portion of which extends between the sheet-metal plates 22, 23. The axis joint comprises a bearing bushing 26 rigidly mounted to the gripping claw 1, as can also be seen in FIG. 5. The bearing bushing is received in the space 27 between the sheet-metal plates 22, 23, coaxially with their openings 24, 25. The bearing bushing 26 includes a slide bearing member comprising a cylindrical sleeve 28, the interior of which is supplied with lubricant via a lubricant nipple 29.

The axis joint comprises a cylindrical bearing shaft 30 extending through the bearing bushing 26 and with its end portions 31, 32 through the openings 24, 25 of the sheet-metal plates 22, 23. The bearing shaft is made of a resilient metal material. Each end portion 31, 32 has an outwardly diverging recess 33, 34 to form an inner conical surface 35, 36 having predetermined conicity and a peripheral clamping portion 37, 38 defined by said conical surface 35, 36, the cylindrical outer surface 39 of the bearing shaft and end surface 41, 42 of the bearing shaft located slightly outside the sheet-metal plate 22, 23. Said conicity is preferably 5°–20°. The clamping portions 37, 38 are homogenous, i.e. free from axial slits or the like. The bearing shaft 30 is in the form of a sleeve with a cylindrical opening 43 running through it, the diameter of the opening corresponding to the smallest diameter of said conical recesses 33, 34 within the end portions 31, 32 into which recesses the opening 43 continues. The sleeve-shaped bearing shaft 30 has predetermined, relatively small wall thickness of 5–20 mm, preferably about 10 mm, in order to contribute to ensuring sufficient resilient expansion of the conical end portions 31, 32. Each of the conical recesses 33, 34 has an axial extension substantially equivalent to or preferably larger than the thickness of the sheet-metal plates 22, 23. The conical end portions 31, 32 are homogenous, i.e. they are free from axial slits which might cause cracks.

The combination of the three considerations, namely the conicity, the axial length of the conical end portion 31, 32 and the maximum thickness of the conical end portion 31, 32 being equivalent to the wall thickness of the bearing shaft, ensures that the conical end portion can expand radially upon application of an external force onto the conical surface 33, 34. To this end the axis joint comprises an engagement member 44, 45 (see also FIG. 8) for each clamping portion 37, 38 provided with a conical outer surface 46, 47 having the same conicity as or slightly greater conicity than the inner conical surface 35, 36 of the clamping portion 37, 38, and also a screw member 48, 49 for axial displacement of the engagement members 44, 45 into the recesses 33, 34 of the end portions in order to press the clamping portions 37, 38 against the sheet-metal plates 22, 23 to form a butt joint of the sheet-metal plates 22, 23, bearing shaft 30 and screw member 48, 49, i.e. with no rotation between the sheet-metal plates 22, 23 and bearing shaft 30 about the central axis 50 of the axis joint. Said conicity is preferably 5°–23°, the difference in conicity being from close to 0° to 3°, preferably 2°.

In the embodiment shown each engagement member consists of a washer 44, 45 with a central opening 51 (FIG. 8), and the screw member consists of a through-bolt 48 and a nut 49 to simultaneously draw the conical washers 44, 45 axially into the recesses. In a suitable embodiment the conicity of the washer 44, 45 is 17°, whereas that of the bearing shaft 30 is 15°. This ensures that a greater initial clamping force is exerted onto the upper part of the clamping portions 37, 38 where they are slimmest.

When assembling the shaft bearing, the bearing shaft 30 is first passed through the openings 24, 25 in the sheet-metal plates 22, 23 and the slide bearings 28 of the bearing bushing. The washer 44 is then fitted over the bolt 48 and the latter is then passed through the bearing shaft 30. The other washer 45 is fitted onto the protruding end of the bolt, and the nut 49 is then screwed onto the bolt 48. When the nut 49 is tightened, the two washers 44, 45 will expand the end portions 31, 32 of the bearing shaft 30 radially out towards the sheet-metal plates 22, 23 since the conical surfaces 46, 47 of the washers will slide along the inner conical surfaces 35, 36 of the bearing shaft 30, thereby locking the bearing shaft 30 against the stand 2 by means of wedge and friction forces. This locking force is dependent partly on the angle of the conical surface 35, 36; 46, 47, partly on the tightening torque applied on the bolt 48 and nut 49, and partly on the wall thickness of the bearing shaft 30. To dismantle the axis joint, the nut 49 is unscrewed after which the entire bearing shaft 30 with bolt 48 and washer 44 can be withdrawn form the bearing bushing 26, thereby releasing the engagement between gripping claw 1 and stand 2.

The embodiment with the conical abutment surfaces on bearing shaft 30 and washers 44, 45 and with the clamping portions 37, 38 clamped directly against the sheet-metal plates 22, 23 provides an extremely reliable locking of the bearing shaft 30, thus eliminating occurrence of the usual problems of play and of the bearing shaft coming loose.

The slide bearing member comprises sealing members 52, 53 arranged at both ends of the sleeve 28 to seal the sliding surfaces 54 against axial penetration of dirt and leakage of lubricant during operation. As can be seen more clearly in FIG. 9, the sleeve 28 and sealing members 52, 53 are made in one piece. Each sealing member 52, 53 consists of an endless, lip-shaped protrusion running immediately close to the end surface 55, 56 of the sleeve 28. The sealing lip 52, 53 has an inner diameter somewhat less than the diameter of the bearing shaft 30 so that the sealing lip 52, 53 exerts sealing pressure against the cylindrical surface of the bearing shaft 30. A suitable difference in diameter is 0.1–1.0 mm. The distance between the cooperating slide surfaces 54 of the sleeve 28 and the bearing shaft 30 is from 0 to 0.1 mm. Each end portion 57, 58 (see FIG. 9) of the sleeve 28 is provided on the outside with a bevel 59, 60 forming a functionally free annular space 61, 62 (see FIG. 6) between itself and the bearing bushing 26. This space 61, 62 enables the sealing lip 52, 53 to expand radially outwards when the bearing shaft 30 is pushed into the sleeve 28, this being retained in the bearing bushing 26, and to effectively seal against the cylindrical surface of the bearing shaft 30. This expansion and pressure are resilient. The unit consisting of sleeve 28 and sealing lips 52, 53 is thus made of a resilient material, preferably plastic, but of course metal with sufficient resilience may also be used. It will be understood that a completely unresilient material, such as bearing bronze, cannot be used. Said annular space 61, 62 can also be obtained by similar bevelling of only the bearing bushing 26 or bevelling of both bearing bushing 26 and sleeve 28. Bevelling of the sleeve 28, however, gives the added advantage that the wall thickness at the end portions 57, 58 of the sleeve 28 is reduced, thereby facilitating expansion of the end portion 57, 58 with the internal sealing lip 52, 53 during assembly, as well as facilitating regulation of the spring pressure to a sufficient level to achieve the desired sealing effect. Consequently, for this purpose the bevel is performed depending on the wall thickness of the sleeve 28, the resilient properties of the material and the rearward space 61, 62 required to give sufficient space for the resilient expansion upon assembly and for the resilient, sealing abutment during operation. To facilitate insertion of the bearing shaft 30 into the sleeve 28, the outer corner of the sealing lip 52, 53 is rounded (see FIG. 10), as is also the edge of the bearing shaft 30 that comes into contact with the sealing lips 52, 53 at assembly.

The sealing lips 52, 53 prevent dirt from penetrating to the sliding surfaces 54 and lubricant from leaking out therefrom during operation. The sealing lips 52, 53 are more efficient than conventional seals and greatly reduce the penetration of dirt. The lubricant is also retained on the sliding surfaces 54 for much longer so that the interval between lubrications can be correspondingly increased. According to the invention lubricant-free journalling can be achieved by selecting the right material for the bearing shaft 30 and slide bearing members 28, 52, 53. Strong anchoring of the unit in the bearing bushing 26, with maximum supporting strength, is obtained by integrating the sealing members 52, 53 (lips) with the sleeve 28. Through the simplified, integrated construction the cost of both manufacture and assembly is decreased in relation to conventional slide bearing arrangements. Neither is it necessary to work the bearing bushing 26 in order to provide seats for loose sealing rings. The spaces 61, 62 radially outside the sealing lips 52, 53 and the resilient properties of the sealing lips enable fresh lubricant to be pressed into the slip surfaces 54 since, due to the increased pressure from the lubricant, the sealing lips will be expanded and old lubricant can be pressed out axially past the sealing lips.

I claim:

1. An axis joint assembly comprising:
    a first construction element comprising first and second parallel connecting pieces spaced apart from each other and having first and second substantially circular openings located opposite each other;
    a second construction element;
    an axis joint rotatably journalling said first and second construction elements for relative rotational movement, said axis joint comprising:
        a bearing bushing rigidly connected to said second construction element and located between said connecting pieces, and substantially concentric with said openings in said connecting pieces;
        said bearing bushing containing a slide bearing comprising a substantially cylindrical sleeve having first and second ends, and provided at each end with internal, resilient sealing lips integral with said sleeve;
        a substantially cylindrical bearing shaft in the form of a sleeve with a substantially cylindrical through-extending opening, said bearing shaft extending through and substantially concentric with said bearing bushing, said shaft having first and second end portions which extending through said first and second openings, respectively, said shaft having end surfaces, and said shaft having an outer substantially cylindrical surface with an outer diameter;
        each of said shaft first and second end portions having an outwardly diverging recess defining an inner conical surface having a predetermined conicity;
        a peripheral clamping portion defined by each of said inner conical surfaces, said outer substantially cylindrical surface of said bearing shaft, and said end surfaces of said bearing shaft;
        a conical washer engaging each clamping portion, each said conical washer having a central opening, and a conical outer surface which engages a said inner conical surface and received within a said shaft end portion;
        a screw member extending through said central opening of each of said conical washers for holding said conical washers with a said shaft end portion so that said clamping portions of said inner conical surfaces abut directly against said connecting pieces so that a butt connection is provided between said bearing shaft and said connecting pieces; and
        annular openings provided radially outwardly from said slide bearing sleeve to permit radial expansion of said sealing lips upon insertion of said bearing shaft into said slide bearing sleeve; and
    during operation of said assembly said sealing lips making a sealing abutment against said bearing shaft; and when said assembly is not in operation, said sealing lips having an inner diameter slightly less than said outer diameter of said bearing shaft so that said sealing lips resiliently expand and also have a sealing abutment against said bearing shaft.

2. An axis joint assembly as recited in claim 1 wherein said predetermined conicity of said inner conical surfaces is between 5°–20°.

3. An axis joint assembly as recited in claim 2 wherein said conical outer surface of each of said conical washers has a conicity equal to or slightly greater than the conicity of said inner conical surfaces.

4. An axis joint assembly as recited in claim 3 wherein the conicity of said outer surface of said conical washer is from slightly more than 0° to 3° greater than the conicity of said inner conical surface.

5. An axis joint assembly as recited in claim 2 wherein said resilient sealing lips inner diameter is between 0.1–1.0 mm less than said outer diameter of said cylindrical surface of said bearing shaft.

6. An axis joint assembly as recited in claim 2 wherein said bearing bushing slide bearing sleeve first and second ends each has an external bevel which forms at least part of said annular opening and regulates the resilient expansion and abutment of said sealing lips so as to enable insertion of said bearing shaft and sealing contact of said sealing lips with said bearing shaft.

7. An axis joint assembly as recited in claim 2 wherein said conical outer surface of each of said conical washers has a conicity equal to or slightly greater than the conicity of said inner conical surfaces.

8. An axis joint assembly as recited in claim 7 wherein the conicity of said outer surface of said conical washer is from slightly more than 0° to 3° greater than the conicity of said inner conical surface.

9. An axis joint assembly as recited in claim 7 wherein said resilient sealing lips inner diameter is between 0.1–1.0 mm less than said outer diameter of said cylindrical surface of said bearing shaft.

10. An axis joint assembly as recited in claim 7 wherein said bearing bushing slide bearing sleeve first and second ends each has an external bevel which forms at least part of said annular opening and regulates the resilient expansion and abutment of said sealing lips so as to enable insertion of said bearing shaft and sealing contact of said sealing lips with said bearing shaft.

11. An axis joint assembly as recited in claim 1 wherein said screw members each comprise a bolt having a threaded free end, and a nut making threaded engagement with the threaded free end of said bolt, so that by tightening said nut on said bolt, said conical washers are drawn axially into said bearing shaft.

12. An axis joint assembly as recited in claim 11 wherein said screw members each consists of said bolt and nut.

13. An axis joint assembly as recited in claim 1 wherein said bearing bushing slide bearing sleeve first and second ends each has an external bevel which forms at least part of said annular opening and regulates the resilient expansion and abutment of said sealing lips so as to enable insertion of said bearing shaft and sealing contact of said sealing lips with said bearing shaft.

14. An axis joint assembly as recited in claim 13 wherein said resilient sealing lips inner diameter is between 0.1–1.0 mm less than said outer diameter of said cylindrical surface of said bearing shaft.

15. An axis joint assembly as recited in claim 1 wherein said slide bearing consists of a substantially cylindrical sleeve having first and second ends, and provided at each end with said resilient sealing lips integral with said sleeve.

16. An axis joint assembly as recited in claim 1 wherein said annular openings are formed by a bevel on an outer surface of said bearing bushing slide bearing sleeve.

17. An axis joint assembly as recited in claim 1 wherein each of said annular openings is formed by a bevel on said bearing bushing.

18. An axis joint assembly as recited in claim 1 wherein said resilient sealing lips inner diameter is between 0.1–1.0 mm less than said outer diameter of said cylindrical surface of said bearing shaft.

19. An axis joint assembly as recited in claim 1 wherein said first and second construction elements comprise claws of a timber grab.

20. An axis joint assembly as recited in claim 19 wherein said timber grab is operated by a hydraulic cylinder which moves said first and second construction elements with respect to each other, rotating with respect to each other at said axis joints.

* * * * *